United States Patent [19]

Okada

[11] Patent Number: 5,781,676
[45] Date of Patent: Jul. 14, 1998

[54] WAVEGUIDE INTEGRATED OPTICAL PICKUP DEVICE AND OPTICAL WAVEGUIDE ELEMENT

[75] Inventor: Kuniaki Okada, Tenri, Japan

[73] Assignee: Sharp Kabushiki Kaisha, Osaka, Japan

[21] Appl. No.: 739,932

[22] Filed: Oct. 30, 1996

[30] Foreign Application Priority Data

Oct. 30, 1995 [JP] Japan .................................. 7-281523

[51] Int. Cl.$^6$ ........................................ G02B 6/34
[52] U.S. Cl. ...................... 385/31; 369/44.23; 385/14; 385/129
[58] Field of Search ........................ 385/11, 14, 15, 385/31, 33–35, 37, 129, 130; 369/13–15, 18, 44.14, 44.23, 44.24

[56] References Cited

U.S. PATENT DOCUMENTS

| | | | |
|---|---|---|---|
| 4,731,527 | 3/1988 | Nomura et al. | 369/44.23 X |
| 4,767,921 | 8/1988 | Kawasaki et al. | 369/44.23 X |
| 4,973,836 | 11/1990 | Matsuoka | 369/44.23 X |
| 5,146,080 | 9/1992 | Opheij | 385/37 X |
| 5,189,651 | 2/1993 | Utsumi | 369/13 |
| 5,235,589 | 8/1993 | Yokomori et al. | 369/112 |
| 5,511,050 | 4/1996 | Matsumoto et al. | 369/44.23 |

FOREIGN PATENT DOCUMENTS

| | | |
|---|---|---|
| 4-289531 | 10/1992 | Japan . |
| 5-101476 | 4/1993 | Japan . |

*Primary Examiner*—John D. Lee
*Attorney, Agent, or Firm*—David G. Conlin; Brian L. Michaelis

[57] ABSTRACT

According to the present invention, an optical pickup device includes: a light source for generating a light beam; an objective lens for converging the light beam onto a recording medium; a beam splitter for splitting the light beam reflected from the recording medium into two light beams; an optical waveguide element for detecting an information signal in accordance with one of the two converged light beams; and an optical element, disposed between the beam splitter and the optical waveguide element, for providing the one of the two converged light beams with astigmatism. The optical waveguide element includes a prism coupler, a waveguide layer, and a photodetecting portion. The optical waveguide element an the optical element are arranged to locate a first focal line of the one of the two converged light beams within a plane of the waveguide layer, to locate a first focal point at an edge of the prism coupler, and to locate a second focal point on the photodetecting portion.

9 Claims, 11 Drawing Sheets

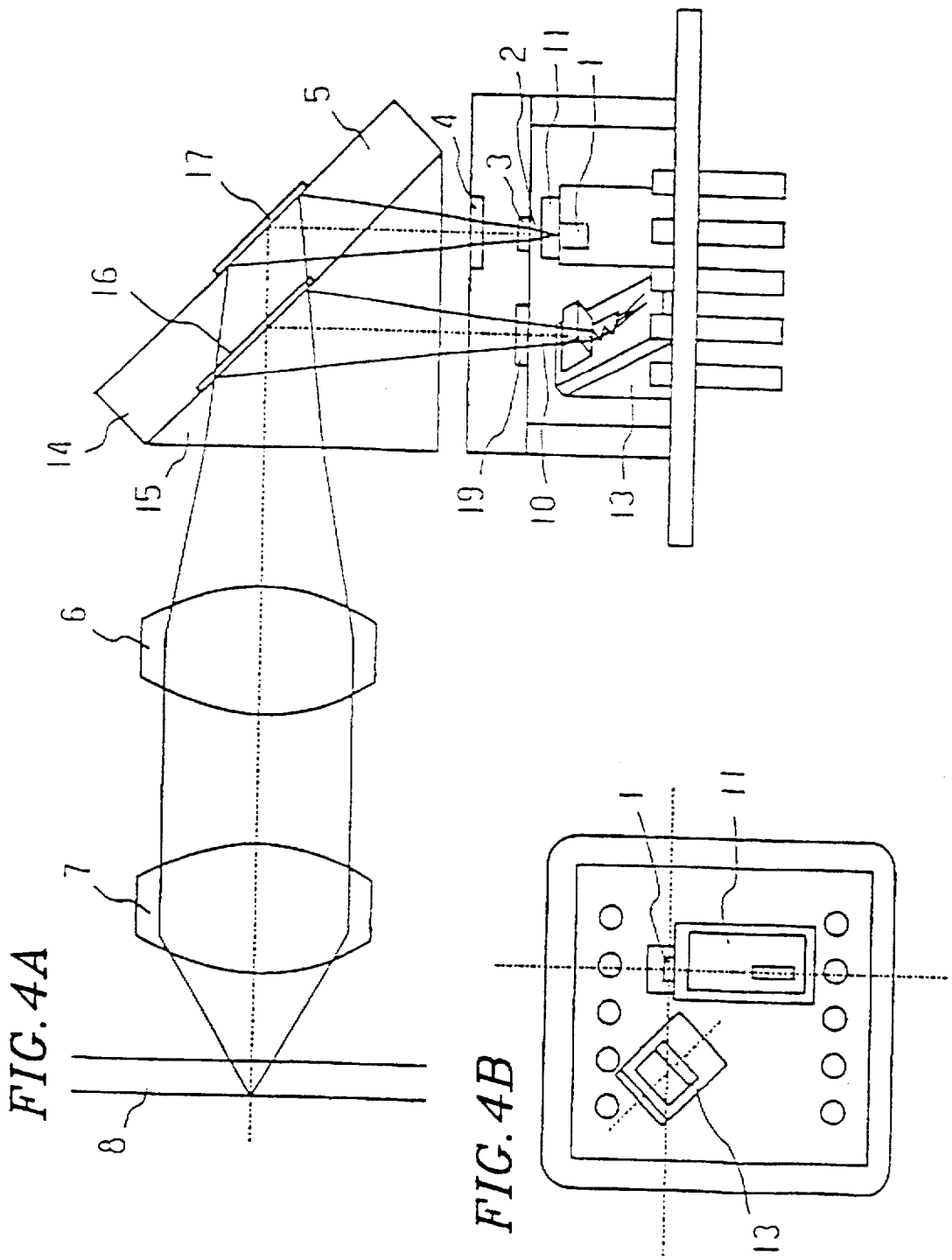

WAVEGUIDE INTEGRATED OPTICAL PICKUP DEVICE AND OPTICAL WAVEGUIDE ELEMENT

BACKGROUND OF THE INVENTION

1. Field of the Invention

The present invention relates to an optical pickup device and an optical waveguide element used for recording information on and reproducing information from an optical information recording medium (hereinafter referred to as an optical disk). More particularly, the present invention relates to a waveguide integrated optical pickup device in which composing elements are integrated onto one substrate and to an optical waveguide element used therein.

2. Description of the Related Art

A conventional waveguide integrated optical pickup device for recording information on and reproducing it from an optical disk is disclosed in Japanese Laid-Open Patent Publication No. 5-101476, and will now be described in conjunction with FIGS. 10 and 11. In this optical pickup device, light emitted by a light source is focused on to an optical disk through a collimating lens and an objective lens, and reflected light from the optical disk is guided into an optical waveguide element, so that a magneto-optical signal and a focus servo error signal can be detected.

Specifically, light emitted by a semiconductor laser 51 is collimated by a collimating lens 52, and the collimated light enters a prism 53 so as to be reflected by an optical waveguide element 56. The reflected light is then focused onto an optical disk 55 by an objective lens 54. Reflected light from the optical disk 55 enters the prism 53 again through the objective lens 54 and is coupled to the optical waveguide element 56.

The optical waveguide element 56 includes, as is shown in FIG. 11, first optical waveguide A in which the effective refractive indices of a TE mode light and a TM mode light are substantially the same, a second optical waveguide B connected with the first optical waveguide A in which the effective refractive indices of the TE mode light and the TM mode light are different from each other, and a third optical waveguide 61 connected with the second optical waveguide B. The prism 53 is adhered to and fixed on the first optical waveguide A.

Light, having passed through the prism 53 and been coupled to the first optical waveguide A, is then coupled to the second optical waveguide B and split into two guided beams. One guided beam enters a focus servo error signal detecting unit including waveguide collecting elements 57a and 7b and photodetectors 58a and 58b, so that a focus servo error signal is detected on the basis of this guided beam. The other guided beam enters a magneto-optical signal detecting unit including the third optical waveguide 61 and photodetectors 59 and 60, so that a magneto-optical signal is detected on the basis of this guided beam.

As is described above, the prism 53 disposed on the first optical waveguide A serves as a coupler which couples light returning from the optical disk 55 to the first optical waveguide A. In order to improve the coupling efficiency, various configurations of the prism coupler and the waveguide have been proposed.

For example, Japanese Laid-Open Patent Publication 4-289531 discloses the configuration as shown in FIG. 12. In this onfiguration, an optical waveguide layer 63 is formed on a substrate 62. On the optical waveguide layer 63, a first gap layer 64 and a second gap layer 65 having smaller refractive indices than the optical waveguide layer 63 are formed in this order. The second gap layer 65 is provided with a taper portion 65a at one end thereof as well as an aperture 66 with a predetermined width W. On the aperture 66, a dielectric prism 67 is adhered and fixed. In this prism coupler, collimated light which enters the dielectric prism 67 is coupled to the optical waveguide layer 63 through the first gap layer 64. This prism coupler can attain coupling efficiency of 80% or more when incident collimated light has a beam width of approximately 1 mm.

In the optical pickup device described in Japanese Laid-Open Patent Publication No. 5-101476, the optical waveguide element is disposed between the collimating lens and the objective lens, so that collimated light with a large beam diameter of several millimeters is coupled through the prism. In this case, the optical waveguide element is increased in size because the size of the optical waveguide element is generally increased as the beam diameter increases.

An optical weveguide element with a large dimension elongates the propagation distance of a guided beam, and the large propagation distance can affect the loss of the guided beam. Specifically, since light is confined within a thin film having a thickness of 1 pm or less in an optical waveguide, a guided beam can be scattered by not only minor irregularities on the interface of the thin film but also a contaminant on the optical waveguide, and the loss can be as large as 1–10 dB/cm. For example, in the case where the propagation loss of the optical waveguide is 10 dB/cm, the propagation efficiency is 80% when the propagation distance is 1 mm, but the propagation efficiency is decreased to merely 10% when the propagation distance is 10 mm. Thus, the light utilization factor can be largely degraded when the propagation distance is large. Accordingly, the optical waveguide is require to be minimized.

Furthermore, in this optical pickup device, a magneto-optical (M) signal and a focus servo error (OF) signal are detected by using the optical waveguide element. When both signals are thus detected by using the optical waveguide element, however, satisfactory signal quality cannot be advantageously attained.

In addition, when the focus servo error signal and the like are detected as in the conventional technique, it is necessary to use a focusing mirror or a waveguide lens for converting collimated light into converged light. It is necessary, however, to deeply trench the waveguide layer to manufacture the focusing mirror, and there arises a problem in preventing a guided beam from being scattered due to the roughness on the etched surface of the focusing mirror thus formed.

When the waveguide lens is used instead of the focusing mirror, other problems can arise. The waveguide lens is classified into a mode index type, a diffraction type, a geodesic type an the like. With regard to the mode index type waveguide lens, it is difficult to attain a small F-number because there is merely a small difference between the effective refractive index in the lens area and that in the periphery. Additionally, the effective refractive index in the lens area is largely different between the TE mode light and the TM mode light, and hence the focal lengths do not accord with each other in these two modes. With regard to the diffraction type waveguide lens, it is disadvantageously difficult to attain a high efficiency, and the focal length can be varied in accordance with variation in the wavelength of incident light. The geodesic type waveguide lens is not suitable to mass-production because high accuracy in the order of μm is required.

In this manner, the focusing mirror and the waveguide lens can cause a number of problems, and hence are not suitable to application in an optical pickup device.

Moreover, in both conventional techniques shown in FIGS. 10 and 12, the incident coupling efficiency of the optical waveguide element is disadvantageously largely varied in accordance with the variations in the incident angle and the wavelength of incident light because collimated light with a large beam diameter in the order of mm is to be coupled to the prism coupler. Accordingly, it is necessary to strictly adjust the optical system in order to improve the incident coupling efficiency. In addition, since the allowable range of the variation in wavelength is small, it is difficult to stably couple light emitted by a semiconductor laser, which can be easily varied in wavelength in accordance with the change of a temperature and the like.

SUMMARY OF THE INVENTION

According to an aspect of the invention, an optical pickup device includes: a light source for generating a light beam; an objective lens for converging the light beam onto a recording medium; a beam splitter for splitting the light beam which has been converged and reflected from the recording medium into two light beams; an optical waveguide element for detecting an information signal in accordance with one of the two converged light beams split by the beam splitter, the optical waveguide element including a prism coupler, a waveguide layer, and a photodetecting portion; and an optical element disposed between the beam splitter and the optical waveguide element, for providing the one of the two converged light beams with astigmatism. The optical waveguide element and the optical element are arranged to locate a first focal line of the one of the two converged light beams within a plane of the waveguide layer, to locate a first focal point at one edge of the prism coupler and to locate a second focal point on the photodetecting portion.

In one embodiment of the invention, the optical element comprises a cylindrical lens having a refractive index of n and a curvature of r, the values of n and r satisfying the following relationship:

$$1/f_2 = (1-n)/r + 1/f_1$$

where $f_1$ is a distance from the cylindrical lens to the first focal point and $f_2$ is a distance from the cylindrical lens to the second focal point.

In another embodiment of the invention, the optical pickup device further includes: a collimating lens, disposed between the light source and the objective lens, for collimating the light beam; and a detecting element for detecting a servo error signal in accordance with the other one of the two light beams, wherein the objective lens converges the light beam from the collimating lens onto the recording medium and allows the converged light reflected from the recording medium to pass therethrough, wherein the beam splitter is disposed between the collimating lens and the light source and splits the converged light passing through the objective lens into two light beams, and wherein the light source, the optical element, the optical waveguide element and the detecting element are accommodated in a single package.

In still another embodiment of the invention, the optical element includes one of a cylindrical lens, a diffraction lens and a glass plate which is disposed to be inclined with respect to an optical axis of the one of the two converged light beams.

In still another embodiment of the invention, the optical pickup device further includes: a collimating lens, disposed between the light source and the objective lens, for collimating the light beam; and a detecting element for detecting a servo error signal in accordance with the other one of the two light beams, wherein the objective lens converges the light beam from the collimating lens onto the recording medium and allows the converged light beam reflected from the recording medium to pass therethrough, wherein the beam splitter is disposed between the objective lens and the collimating lens, and wherein the optical element includes a toric lens disposed between the beam splitter and the optical waveguide element.

According to another aspect of the invention, the optical pickup includes: a light source for generating a light beam; an objective lens for converging the light beam onto a recording medium; an optical waveguide element for detecting an information signal based on the converged light reflected from the recording medium, the optical waveguide element including a prism coupler, a waveguide layer and a photodetecting portion; and an optical element, disposed in an optical path on the light incident side of the optical waveguide element, for providing the converged light with astigmatism. The optical waveguide element and the optical element are arranged to position a first focal line within a plane of the waveguide layer, to position a first focal point at an edge of the prism coupler and to position a second focal point on the photodetecting portion.

According to still another aspect of the invention, the optical waveguide element for detecting a signal in accordance with a converged light beam having astigmatism includes: a photodetecting portion for detecting the signal; a waveguide layer for propagating the converged light beam having astigmatism to the photodetecting portion; and a prism coupler for coupling the converged light having astigmatism which is incident thereon to the wave guide layer. The photodetecting portion and the prism coupler are arranged to locate a first focal line with in a plane of the waveguide layer, to locate a first focal point at an edge of the prism coupler, and to locate a second focal point on the photodetecting portion.

In one embodiment of the invention, the optical waveguide element further includes an optical element for providing an incident converged light beam having no astigmatism with astigmatism, the optical element being disposed on a surface of the prism coupler.

Thus, the invention described herein makes possible the advantages of providing an optical pickup device and an optical waveguide element having a compact size and improved incident coupling efficiency while requiring neither a focusing mirror nor a waveguide lens.

This and other advantages of the present invention will become apparent to those skilled in the art upon reading and understanding the following detailed description with reference to the accompanying figures.

BRIEF DESCRIPTION OF THE DRAWINGS

FIGS. 4A and 4B are schematic diagrams for showing a modification of the optical pickup device of FIGS. 3A and 3B using a diffraction lens;

DESCRIPTION OF PREFERRED EMBODIMENTS

The optical pickup device of this invention will now be described in detail referring to the accompanying drawings.

EXAMPLE 1

Figure 1:
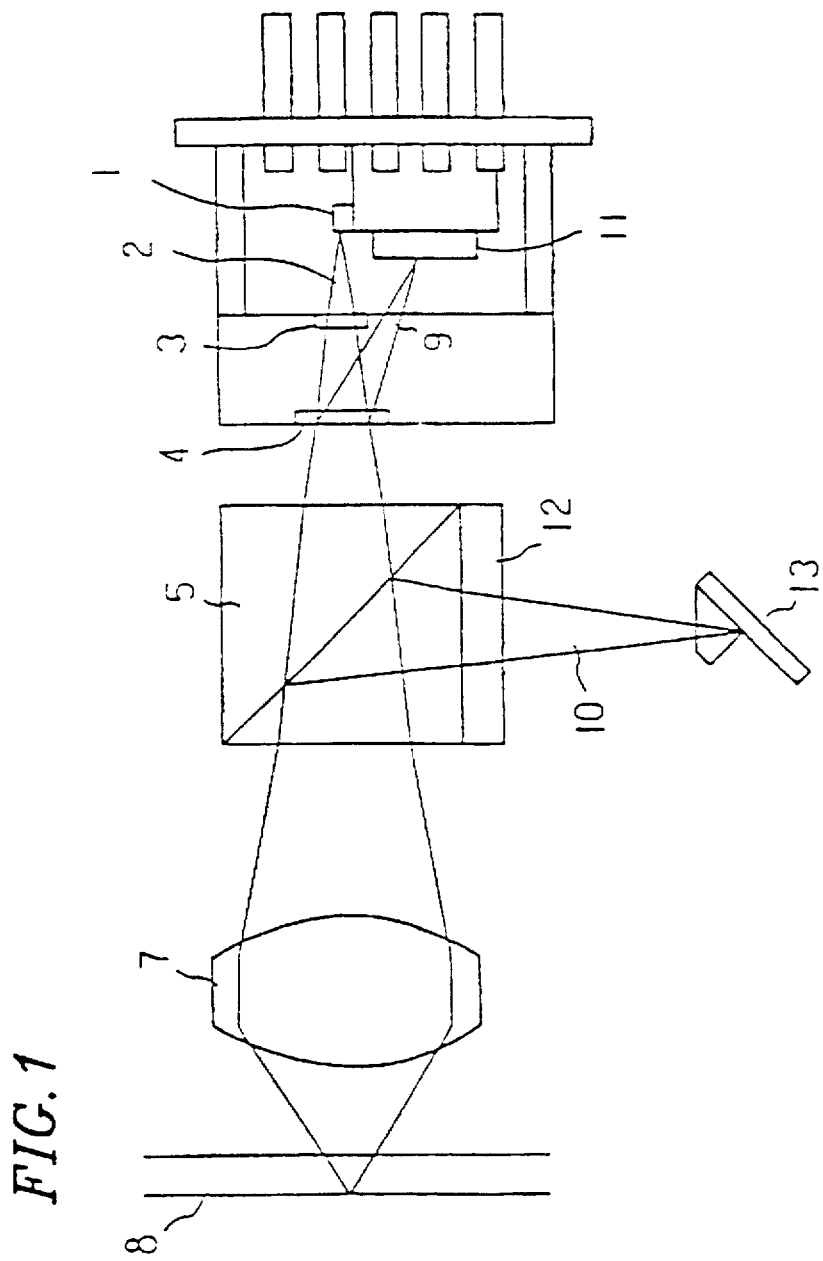
FIG. 1 is schematic diagram for showing a first example of an optical pickup device of the invention.

FIG. 1 shows the configuration of an optical pickup device according to a first example of this invention. The optical pickup device comprises a semi-conductor laser 1 serving as a light source, a grating 3, a holographic optical element 4, a beam splitter 5, an objective lens 7, a photodiode 11, a cylindrical lens 12 and an optical waveguide element 13. Light 2 emitted by the semiconductor laser 1 is transmitted by the grating 3 and the holographic optical element 4 and passes through the beam splitter 5. Then, the light 2 is focused onto a magneto-optical disk 8 serving as a recording medium by the objective lens 7.

Light reflected by the magneto-optical disk 8 passes through the objective lens 7 and enters the beam splitter 5, where the light is split into a servo error signal detecting light beam 9 and a magneto-optical signal detecting light beam 10. The servo error signal detecting light beam 9 enters the holographic optical element 4 which diffracts the light beam 9 toward the photodiode 11. The photodiode 11 generates an electric signal as a servo error signal in accordance with the amount of the light incident thereon.

The magneto-optical signal detecting light beam 10 has its optical path bent by 90° (degrees) by the beam splitter 5, and is converted into light having astigmatism by the cylindrical lens 12. The converted light is guided into the coupler portion of the optical waveguide element 13 to be coupled to the optical waveguide thereof as will be described later. The coupled light is then split into two light beams which have different polarizations. The two light beams are guided into photodetectors, where a magneto-optical signal is obtained based on the light beams.

Figure 10:
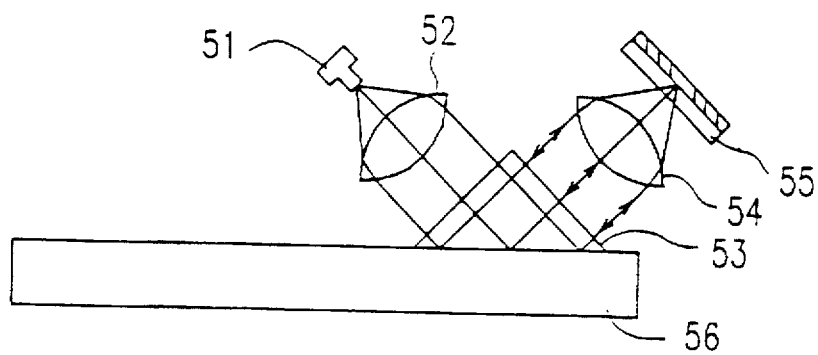
FIG. 10 is a sectional view of a conventional optical pickup device.
Figure 11:
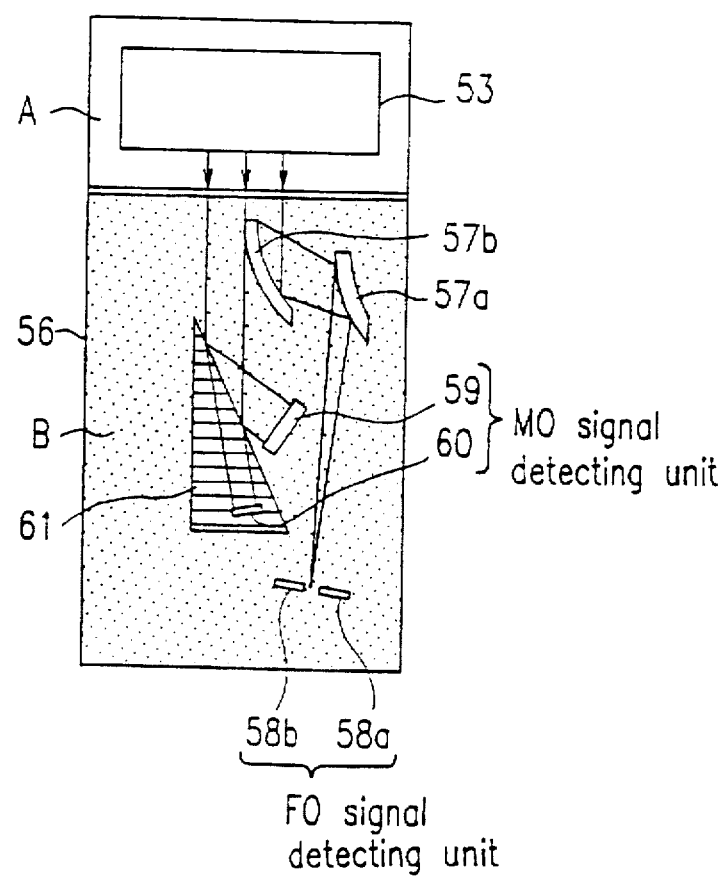
FIG. 11 is a sectional view of an optical waveguide element used in the conventional optical pickup device of FIG. 10.
Figure 12:
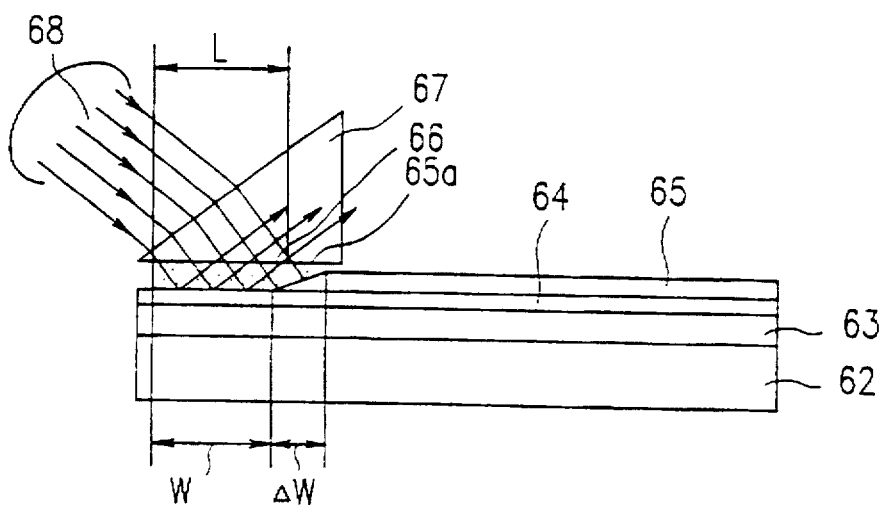
FIG. 12 is a sectional view of a conventional prism coupler.

In the conventional technique shown in FIG. 10, which includes the optical waveguide element for detecting a magneto-optical signal disposed between the objective lens and the colimating lens, collimated light with a large beam diameter in the order of millimeters is coupled to the waveguide by the prism. When the incident light upon the waveguide is collimated light having such a large beam diameter there arises various problems such as the narrow allowable ranges of the variations in the incident angle and the wavelength and the increased size of the optical waveguide element as described above. This occurs for the following reason: When an incident angle deviates from the optimal incident angle, the phase plane of a resultant guided beam is also shifted. Therefore, incident light having a larger beam diameter causes a larger shift of the phase plane even when the incident angle deviates to the same extent.

In view of the aforementioned fact, these various problems are overcome in the present invention by allowing converged light to enter and be coupled to the optical waveguide element. In such a case where converged light is used, the deviation of the phase plane in the incident plane can cause a problem. However, the wave surface of converged light is in the form of a plane at its focal point and the converged light is substantially a plane wave n the vicinity of the focal point. Therefore, the incident coupling efficiency is substantially the same as that in the case where collimated light is coupled through a prism and can be attained by positioning the focal point of the converged light at the boundary between the prism and the optical waveguide element.

At this point, since the beam diameter of the converged light to be coupled to the prism coupler is small, the allowable range of the variation in the incident angle can be enlarged, so that the incident angle can be more easily adjusted than in the conventional technique. Since the allowable range of the variation in the wavelength is also enlarged as the beam diameter decreases, there arises no problem derived from the usage of the semiconducter laser as the light source. In addition, due to the same effect as that to enlarge the allowable range of the variation in the incident angle, the incident coupling efficiency becomes less sensitive to a difference in the effective refractive index between the TE mode and the TM mode, and hence, a difference in the coupling efficiency between these two modes can also be decreased. These are satisfactorily advantageous in an optical pickup device for a magneto-optical disk where a magneto-optical signal is detected by using an optical waveguide element.

When, for example, collimated light with an incident diameter of 1 mm is allowed to enter a prism coupler, it is necessary to suppress the range of the variations in the incident angle $\Delta\theta$ and the wavelength $\Delta\lambda$ to $\pm 0.01°$ and $\pm 0.1$ nm, respectively in order to achieve an incident coupling efficiency of 70%. In contrast, when converged light with a numerical aperture (NA) of 0.17 is allowed to enter the prism coupler, the range of the variations of the incident angle $\Delta\theta$ and the wavelength $\Delta\lambda$ can be enlarged to $\pm 1°$ and $\pm 40$ nm, respectively.

When the converged light is directly coupled through the prism, however, a guided beam spreads, after such coupling, in the optical waveguide layer by the same angle as the radiation angle of a semiconductor laser beam. In such a case, problems arise such as requiring a photodetector with a large light receiving surface and requiring the length of the optical waveguide to be small for suppressing the spread.

In the case where an optical waveguide type polarization mode splitter is used, the polarized beam separating property can be degraded when the spread angle of a guided beam is larger than a separating angle between the two modes, resulting in failing to obtain a magneto-optical signal. In particular, in order to attain a high speed response of the photodetector, a smaller area of the light receiving surface is desirable and the spread of a guided beam should be suppressed. It is possible to suppress the spread of the guided beam by using a collective mirror or a waveguide lens as described above, but the usage of these elements is undesirable because it is difficult to manufacture them and to attain the desired characteristics.

In order to overcome the aforementioned problems, the converged light to be incident on the prism coupler is provided with astigmatism in this invention, so that the two focal points derived from the astigmatism are positioned at the boundary between the prism and the optical waveguide layer and at the light receiving surface of the photodetector, respectively.

This arrangement will now be described in more detail referring to FIG. 2.

Figure 2:
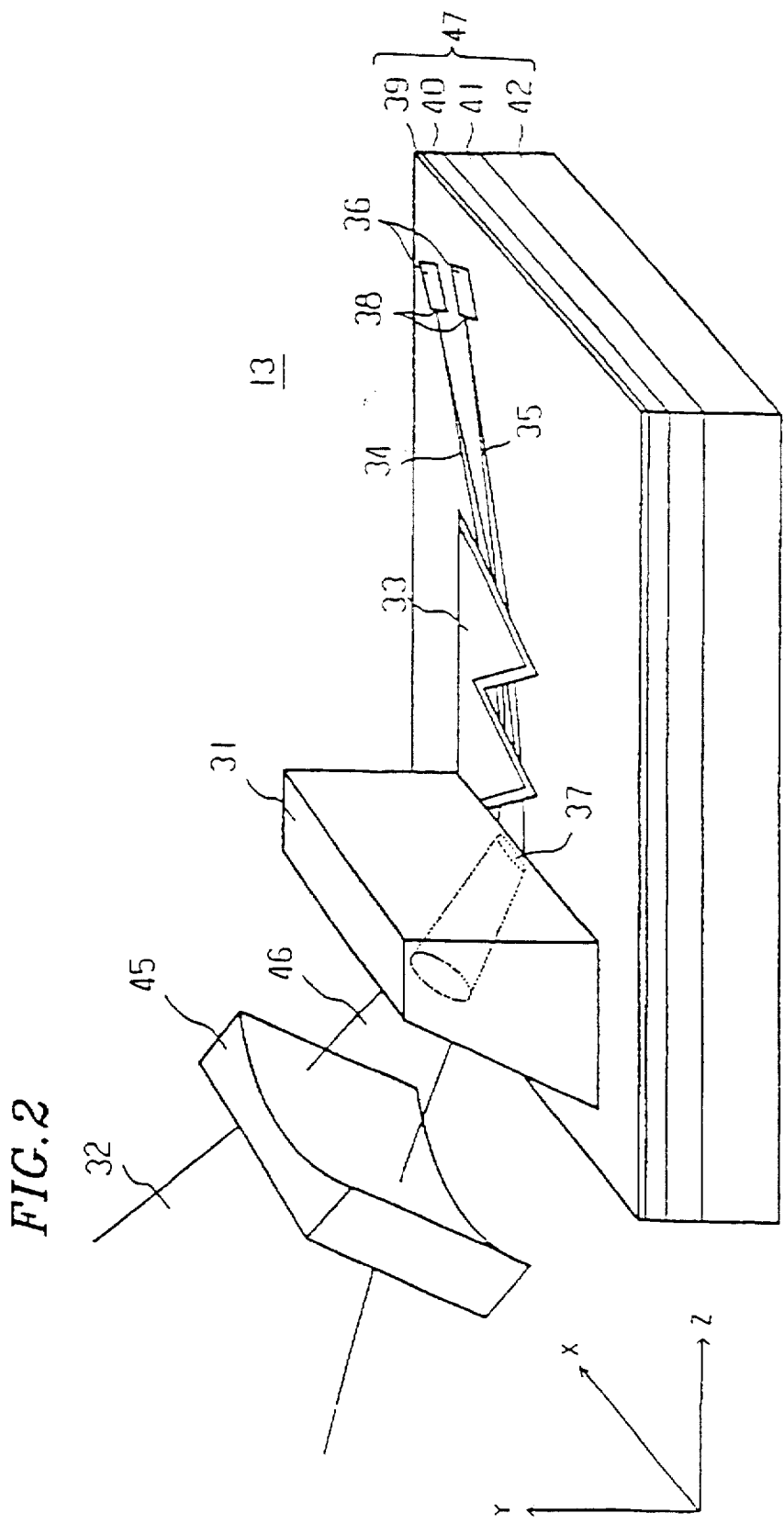
FIG. 2 is a perspective view of an optical waveguide element used in the optical pickup device of FIG. 1.

FIG. 2 shows an optical system comprising the optical waveguide element 13. The optical waveguide element 13 includes a prism 31 serving as a coupler and an optical waveguide 47. The optical waveguide 47 consists of a first dielectric layer 39, a second dielectric layer 40, a third dielectric layer 41 and a substrate 42. The optical system further includes a cylindrical lens 45. The cylindrical lens 45 corresponds to the cylindrical lens 12 disposed in front of the splitter 5 as shown in FIG. 1. Converged light 32 from the splitter 5, having entered this optical system, passes through the cylindrical lens 45 and is converted into converged light 46 with astigmatism, namely, having a first focal point 37 and a second focal point 38. The distance between the first focal point and the second focal point (i.e., the astigmatic focal distance) depends upon the refractive index and the curvature of the cylindrical lens 45.

Among the two focal points 37 and 38, the first focal point 37, having a focal line on the xy plane, is positioned at the boundary between the prism 31 and the first dielectric layer 39, which serves as an optical waveguide layer, and at the edge of the prism 31 by adjusting the positions of the optical waveguide element 13 and the cylindrical lens 45. Also, the second focal point 38, having a focal line on the yz plane, is positioned at the light receiving surface of the photodetector by designing the refractive index and the curvature of the cylindrical lens 45.

In this case, on the boundary plane between the prism 31 and the optical waveguide layer 39, the incident light 46 upon the prism 31 is converged on the yz plane. Accordingly, this incident light is coupled to the optical waveguide with the same efficiency as that attained by converged light having no aberration. The coupled light is separated into a TE mode light 34 and a TM mode light 35 at a polarized beam separating portion 33 which includes a layer with a large refractive index, and is focused onto the light receiving surface of the photodetector. As a result, this light is detected by the photodetectors 36, thereby obtaining a magneto-optical signal.

The incident coupling efficiency of the prism coupler is substantially determined by the relationship between the beam diameter of the incident light 46 projected in the propagation direction (z direction) of the guided beam and the structure of the optical waveguide element (specifically, the thickness of a layer interposed between the optical waveguide layer and the prism). Therefore, the coupling efficiency is not substantially degraded by the spread of the incident light on the xz plane. Accordingly, when incident light with an NA of 0.17 is allowed to enter, the beam diameter of the incident light projected in the z direction can be as small as several tens of microns, and hence, the allowable ranges of the variations in the incident angle and the wavelength can be enlarged. In addition, since the beam diameter of the incident light is small, the optical waveguide element can be decreased in size.

After coupling to the optical waveguide, the guided beam is not diverged, but converged, and hence, the converged light enters the light receiving surface of the photodetector. As a result, the area of the light receiving surface can be decreased, resulting in a quick response of the photodetector. Thus, there is no need to use the collective mirror or the waveguide lens which both have various problems in their manufacture and performance.

Since the astigmatic focal distance can be freely set by changing the curvature of the cylindrical lens, the degree of freedom in designing the optical waveguide element can also be increased. Additionally, since converged light can be used as the guided beam in the optical waveguide type polarization mode splitter utilizing refraction, the guided beam can be separated into the two modes regardless of the mode separating angle. This is particularly advantageous in using the polarization mode splitter because a smaller beam diameter of incident light can decrease the difference in the incident coupling efficiency between the respective polarized beams.

In the case were the astigmatism is provided by using a plano-concave cylindrical lens, the refractive index and the curvature of the lens are determined so as to satisfy the following relationship:

$$1/f_2=(1-n)/r+1/f_1$$

wherein $f_1$ indicates a distance between the lens and the first focal point, $f_2$ indicates a distance between the lens and the second focal point, and n and r indicate the refractive index and the curvature of the lens, respectively.

On the basis of this relationship, in the case where a distance between the first focal point and the second focal point is, for example, 1 mm, the distance $f_1$ between the lens and the first focal point is 1 mm, the refractive index of the lens is 1.5, and the curvature of the lens is 1 mm.

EXAMPLE 2

Figures 3A, 3B:
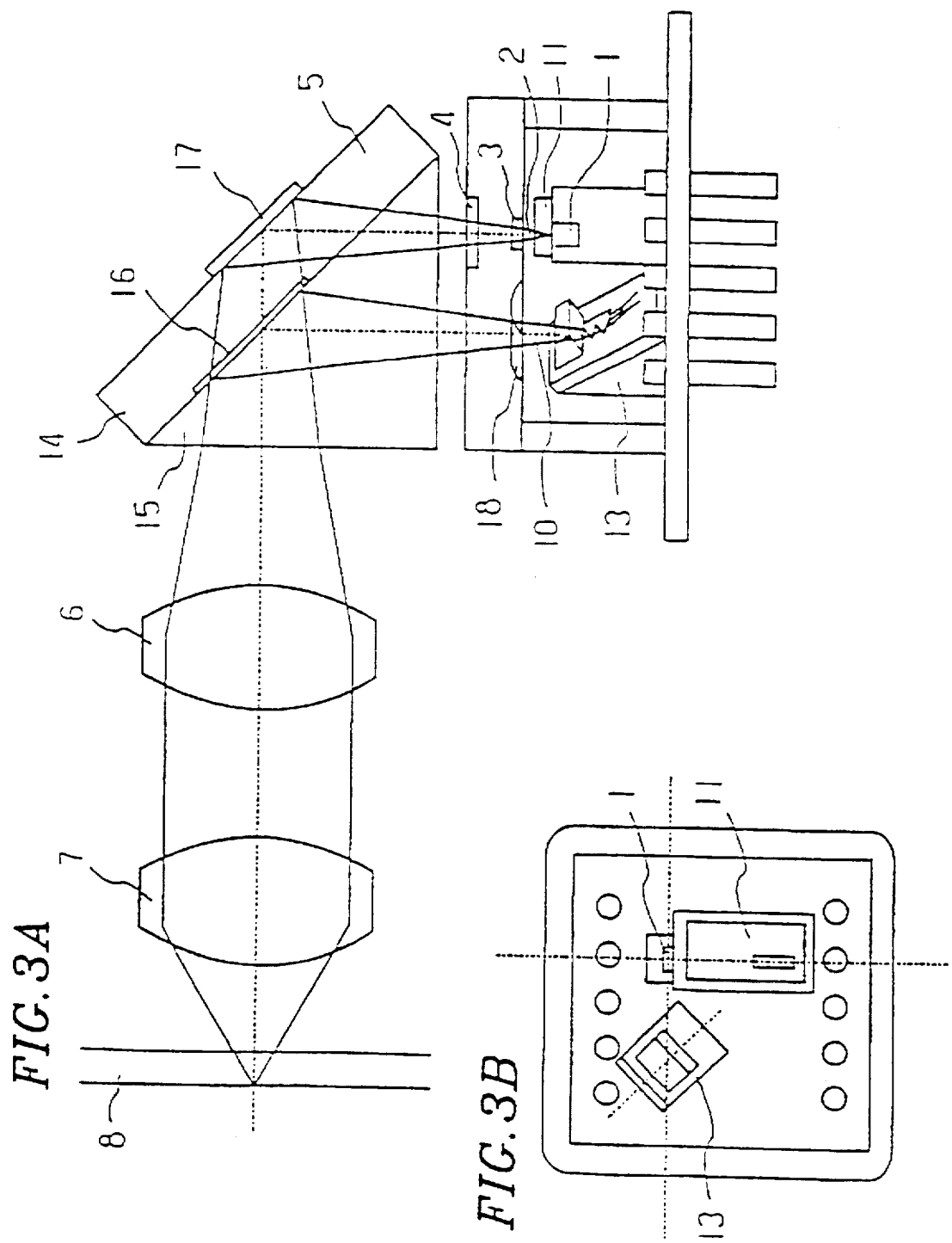
FIGS. 3A and 3B are schematic diagrams for showing a second example of the optical pickup device of the invention.

FIGS. 3A and 3B show a second example of the present optical pickup device.

Light 2 emitted by a semiconductor laser 1 serving as a light source is transmitted by a grating 3 and a holographic optical element 4 and enters a beam splitter 5. The beam splitter 5 includes a glass plate 14 adhered to a prism 15, and a polarized beam selecting film 16 is formed in a part between the glass plate 14 and the prism 15. On the rear surface of the glass plate 14, a total reflecting mirror 17 is disposed. The light, having entered the beam splitter 5 from the holographic optical element 4, is reflected by the total reflecting mirror 17, and the reflected light is transmitted by a collimating lens 6 and focused onto a magneto-optical disk 8 serving as a recording medium by an objective lens 7.

The light is reflected by the magneto-optical disk 8 to return toward the objective lens 7. The returning light passes through the objective lens 7 and the collimating lens 6 and enters the beam splitter 5, where the light is split into servo error signal detecting light and magneto-optical signal detecting light beam 10 by the polarized beam selecting film 16. The servo error signal detecting light enters the holographic optical element 4 to be diffracted and is guided into a photodiode 11 to be detected as a servo error signal. The magneto-optical signal detecting light beam 10 is provided with astigmatism by a cylindrical concave lens 18 and is guided into the coupler portion of an optical waveguide element 13. The optical waveguide element 13 separates the light coupled thereto into two polarized light beams having different polarizations, and detects a magneto-optical signal based on the two polarized light beams using photodetectors. Since the light coupled to the optical waveguide element 13 has the astigmatism, the coupling efficiency is high and the polarized beam separation can be effected with high performance.

When this configuration is adopted, after disposing the semiconductor laser device 1 and the optical waveguide element 13, the cylindrical lens 18, the beam splitter 5 and the like are also required to be disposed. At this point, deviation of the curvature of the cylindrical lens 18 from a designed value can shift the position of one of the two focal points. The shift of the position of the first focal point can largely decrease the incident coupling efficiency, and hence, the axis of the cylindrical lens 18 is required to be adjusted so that the position of the first focal point cannot be affected by the cylindrical lens.

The means for providing the astigmatism is not limited to the usage of the cylindrical lens but can be the usage of a diffraction type lens or a glass plate.

Figure 5:
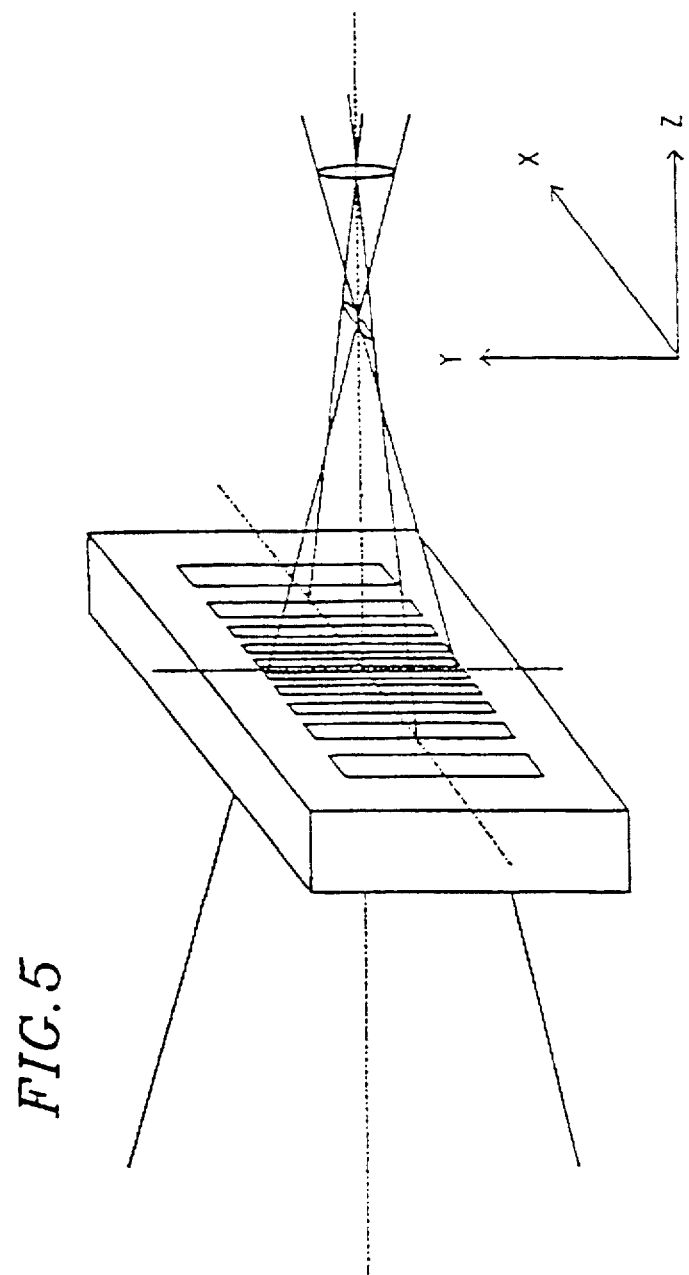
FIG. 5 is a perspective view of a Fresnel zone plate type lens used in the optical pickup device of FIGS. 4A and 4B.

FIGS. 4A and 4B show an optical pickup device comprising a diffraction type lens 19 instead of the cylindrical lens 18 of the optical pickup device of FIGS. 3A and 3B. As the diffraction type lens, a unidimensional lens such as a Fresnel zone plate type lens as is shown in FIG. 5 can be used. This lens works as a concave lens against a beam on the xz plane but as a simple plate against a beam on the yz plane, and hence can provide the astigmatism.

When a diffraction type concave lens is used, the lens is positioned so that its first focal point (i.e., the focal point closer to the lens) can accord with the focal point of the collimating lens. A diffraction type convex lens cannot be used because the position of its first focal point can be varied depending upon the wavelength of incident light, so as to decrease the coupling efficiency of light coupled to the optical waveguide at the first focal point.

Figure 6:
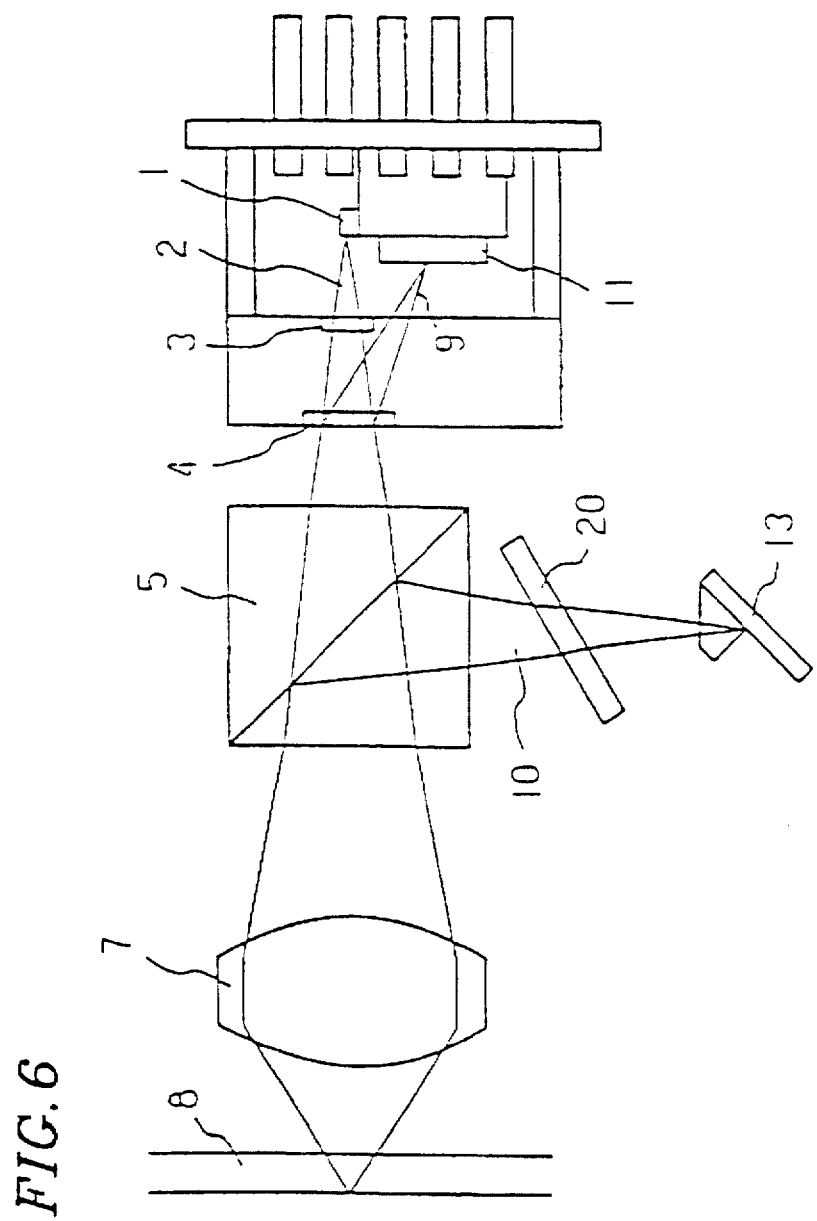
FIG. 6 is a schematic diagram for showing another modification of the optical pickup device of FIGS. 3A and 3B using a glass plate.

FIG. 6 shows an optical pickup device comprising a glass plate instead of the cylindrical lens. As is shown in FIG. 6, the glass plate 20 is positioned to thereby be tilted on the optical path of the converged incident light upon the optical waveguide element 13, thereby providing the incident light with the astigmatism. The astigmatic focal distance αz is represented by the following equation:

$$\Delta z = -t \cdot \frac{(N^2 - 1)\sin^2\theta}{(N^2 - \sin^2\theta)^{3/2}}$$

wherein t indicates the thickness of the glass plate, N indicates the refractive index thereof, and e indicates the angle formed between the normal line of the glass plate and the optical axis.

Accordingly, parameters such as the tilt angle of the glass plate 20 are determined so that the astigmatic focal distance αz can be equal to the distance between the edge of the prism and the light receiving surface of the photodetector. Further, the position of the optical waveguide element 13 is adjusted so that the first focal point and the second focal point can be positioned at the edge of the prism and the light receiving surface of the photodetector, respectively.

EXAMPLE 3

Figure 7:
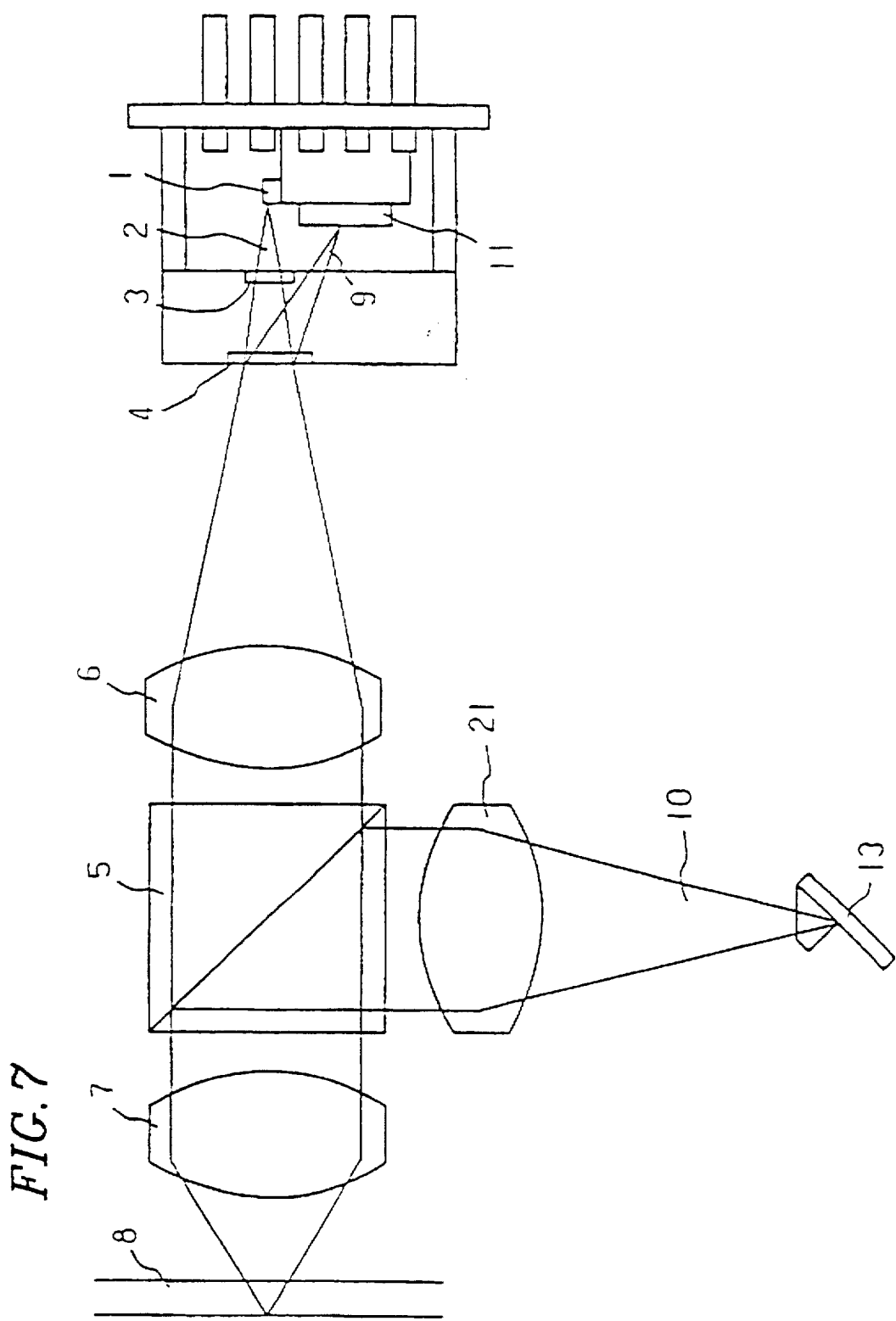
FIG. 7 is schematic diagram for showing a third example of the optical pickup device of the invention.

FIG. 7 shows a third example of the present optical pickup device. In this optical pickup device, a beam splitter 5 is disposed between an objective lens 7 and a collimating lens 6. Light reflected by a magneto-optical disk 8 is split into servo error signal detecting light beam 9 and magneto-optical signal detecting light beam 10 by the beam splitter 5. The magneto-optical signal detecting light beam 10 has its optical path bent by 90°, and is focused onto the prism coupler of an optical waveguide element 13 by a toric lens 21.

In the case where the beam splitter 5 is disposed in the optical path of converged light so that the converged light is incident thereon, a satisfactory polarized beam separating property cannot be attained. This is because the polarized beam separating property is largely affected by the incident angle. Therefore, a toric lens is used in this example in order to improve the polarized beam separating property. A toric lens has different curvatures along two perpendicular axes and can convert collimated light into converged light having astigmatism. Owing to the usage of the toric lens, the beam splitter can be disposed in the optical path of the collimated light, resulting in an improved polarized beam separating property of the beam splitter.

Now, the optical waveguide element used in this invention will be described in more detail referring to FIG. 8. On a substrate 42, a third dielectric layer 41, a second dielectric layer 40 and a first dielectric layer 39, which serves as an optical waveguide layer, are formed in that order. A prism coupler 31 is adhered to the uppermost first dielectric layer 39.

The refractive indexes np, n1, n2 and n3 of the prism coupler 31, the first dielectric layer 39, the second dielectric layer 40 and the third dielectric layer 41 are determined so as to satisfy the following relationship:

$$np > n2 > n1, n3$$

In one example, the refractive indices and the thicknesses of the prism coupler and the respective layers are set as is listed in the following table:

|  | Refractive index | Thickness |
|---|---|---|
| Prism coupler | 1.60 | — |
| First dielectric layer | 1.43 | 100 nm |
| Second dielectric layer | 1.53 | 580 nm |
| Third dielectric layer | 1.44 | 2500 nm |

When converged light with a beam diameter of several microns enters the prism coupler, an incident coupling efficiency of approximately 80% can be attained. Moreover, since the allowable ranges of the variations in the incident angle and the wavelength can be enlarged, a coupling efficiency of 70% can be attained when the incident angle and the wavelength are in the ranges of the optimal incident angle ±1° and the optimal wavelength ±40 nm, respectively. When the cylindrical lens 43 is disposed in the optical path of the incident light, the resultant converged light can be provided with astigmatism and the spread of the guided beam in the optical waveguide layer can be suppressed.

The cylindrical lens 43 can be replaced with a diffraction type lens, a tilted glass plate or the like. In the case where collimated light is guided to the prism coupler, the collimated light can be converted into converged light having astigmatism by disposing a toric lens in the optical path of the incident light.

Figure 8:
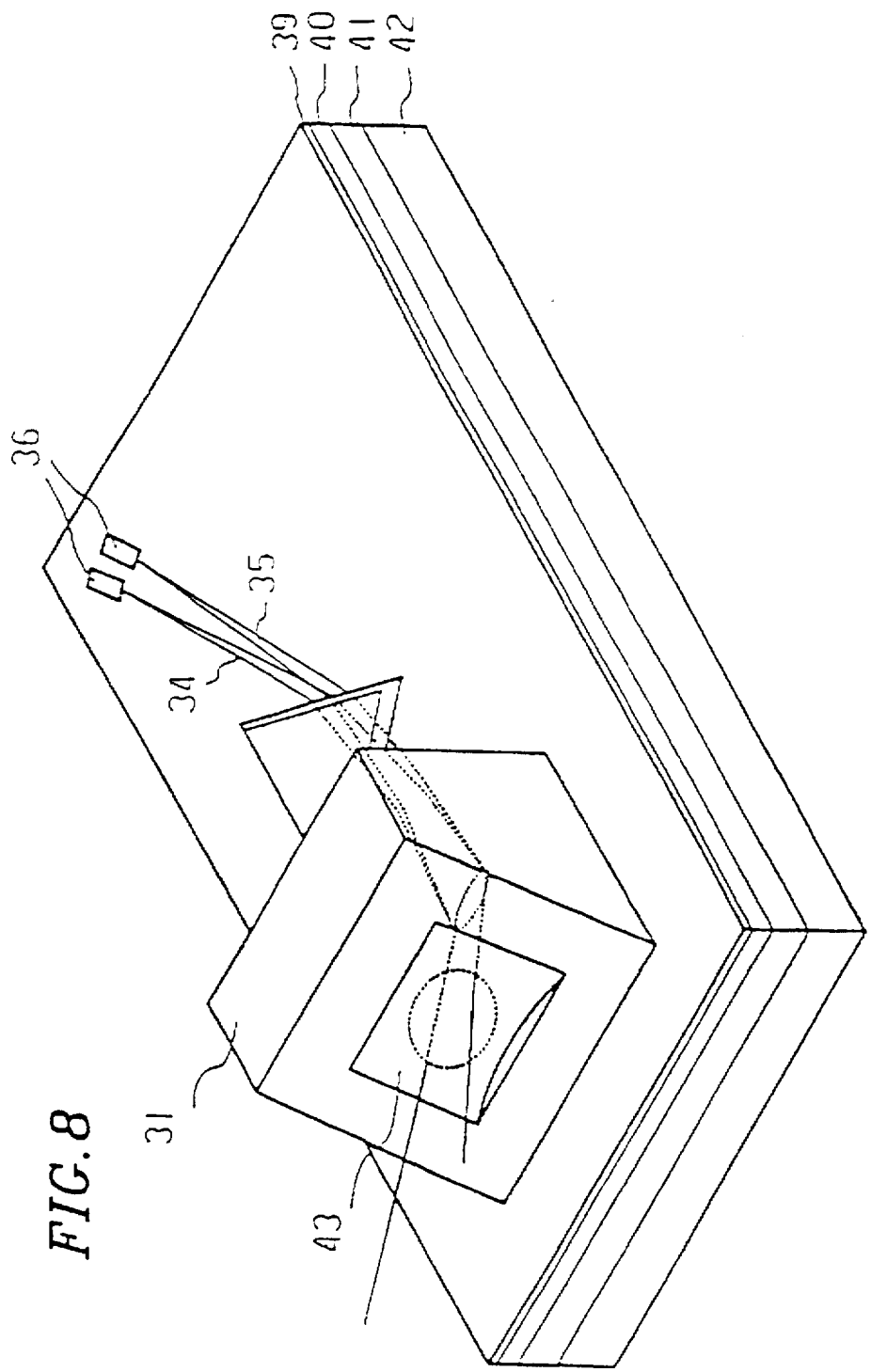
FIG. 8 is a perspective view illustrating a configuration of an optical waveguide element including means for providing astigmatism and a prism coupler integrated with each other.

In the optical waveguide element shown in FIG. 8, the cylindrical lens 43 is disposed on the incident surface of the prism coupler 31. The incident light upon the optical waveguide element is provided with astigmatism by the cylindrical concave lens 43, and hence, not only can the allowable ranges of the variations in the incident angle and the wavelength be enlarged by using this light without decreasing the incident coupling efficiency, but the guided beam can also be focused onto the light receiving surface of the photodetector. When the prism coupler 31 is manufactured by plastic molding or the like, the cylindrical lens can be easily formed on the surface of the prism. Thus, the optical waveguide element can be integrated with the cylindrical lens 43, resulting in a decreased number of composing elements.

Figure 9:
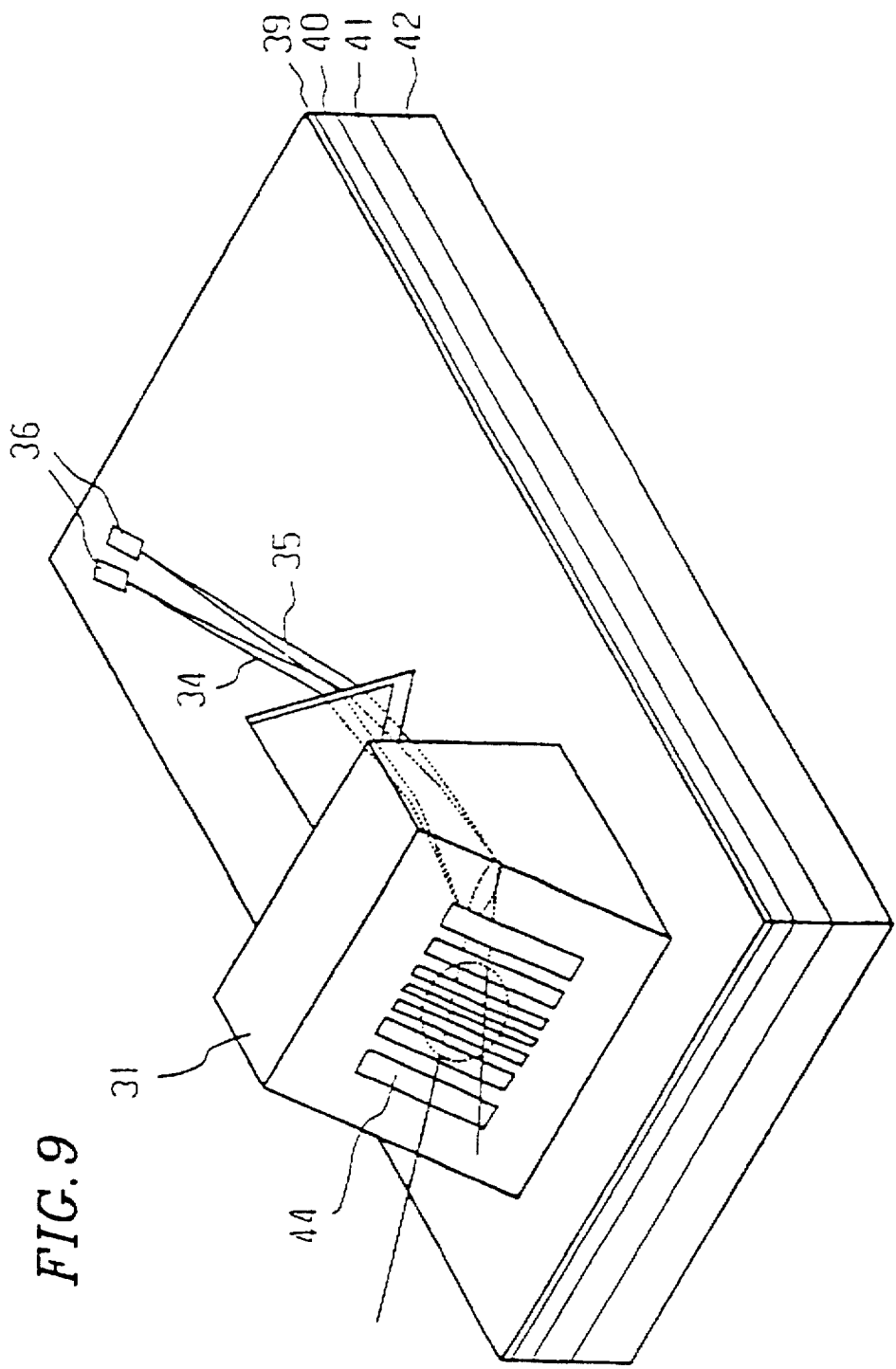
FIG. 9 is a perspective view illustrating another configuration of the optical waveguide element including the means for providing astigmatism and the prism coupler integrated together.

FIG. 9 shows an optical waveguide element using a diffraction type lens 44 formed on the incident surface of the prism coupler 31. Incident light upon the optical waveguide element is provided with astigmatism by the diffraction type concave lens 44, and hence, not only can the allowable ranges of the variations in the incident angle and the wavelength be enlarged by using this light without decreasing the incident coupling efficiency, but the guided beam can also be focused onto the light receiving surface of the photodetector. When the prism coupler 31 is manufactured with plastic molding or the like, the diffraction type lens 44 can be easily formed on the surface of the prism coupler 31. Thus, the optical waveguide element can be integrated with the diffraction type lens, resulting in a decreased number of composing elements.

In this manner, the present optical pickup device comprises the means for providing astigmatism to incident light in the optical path, so that converged light with astigmatism is coupled to the optical waveguide element. As a result, the allowable ranges of the variations in the incident angle and the wavelength can be enlarged, and the spread of a guided beam in the optical waveguide layer can be suppressed. Furthermore, the respective composing elements are positioned so that the first focal line of the converged light with the astigmatism can be included in the optical waveguide layer, the first focal point can be positioned at the edge of the prism, and the second focal point can be positioned at the light receiving surface of the photodetector of the optical waveguide element. Thus, the allowable ranges of the variations in the incident angle and the wavelength can be most effectively enlarged, the spread of the guided beam can be suppressed, and the optical waveguide element can be made compact.

In addition, when the light source, the photodetecting device and the optical waveguide element are accommodated in one package, the entire optical pickup device can be made compact.

Also, the composing elements of the present optical waveguide element are positioned so that the first focal line of the converged light with astigmatism can be included in the optical waveguide layer, the first focal point can be positioned at the edge of the prism, and the second focal point can be positioned at the light receiving surface of the photodetector of the optical waveguide element. Thus, the allowable ranges of the variations in the incident angle and the wavelength can be most effectively enlarged, and the spread of the guided beam can be suppressed. Furthermore, when the means for providing astigmatism to detecting light is integrated with the prism coupler, the number of the composing elements can be decreased, resulting in minimizing the size of the entire optical pickup device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical pickup device comprising:
   a light source for generating a light beam;
   an objective lens for converging the light beam onto a recording medium;
   a beam splitter for splitting the light beam which has been converged and reflected from the recording medium into two light beams;
   an optical waveguide element for detecting an information signal in accordance with one of the two converged light beams split by the beam splitter, the optical waveguide element including a prism coupler, a waveguide layer, and a photodetecting portion; and
   an optical element, disposed between the beam splitter and the optical waveguide element, for providing the one of the two converged light beams with astigmatism,
   wherein the optical waveguide element and the optical element are arranged to position a first focal line of the one of the two converged light beams within a plane of the waveguide layer, to position a first focal point at one edge of the prism coupler and to position a second focal point on the photodetecting portion.

2. An optical pickup device according to claim 1, wherein the optical element includes one of a cylindrical lens, a diffraction lens and a glass plate which is disposed to be inclined with respect to an optical axis of the one of the two converged light beams.

3. An optical pickup device according to claim 1, wherein the optical element comprises a cylindrical lens having a refractive index of n and a curvature of r, the values of n and f satisfying the following relationship:

$$1/f_2 = (1-n)/r + 1/f_1$$

where $f_1$ is a distance from the cylindrical lens to the first focal point and $f_2$ is a distance from the cylindrical lens to the second focal point.

4. An optical pickup device according to claim 1, further comprising:
   a collimating lens, disposed between the light source and the objective lens, for collimating the light beam; and
   a detecting element for detecting a servo error signal in accordance with the other one of the two light beams,
   wherein the objective lens converges the light beam from the collimating lens onto the recording medium and allows the converged light reflected from the recording medium to pass therethrough,
   wherein the beam splitter is disposed between the collimating lens and the light source and splits the converged light passing through the objective lens into two light beams, and
   wherein the light source, the optical element, the optical waveguide element and the detecting element are accommodated in a single package.

5. An optical pickup device according to claim 4, wherein the optical element includes one of a cylindrical lens, a diffraction lens and a glass plate which is disposed to be inclined with respect to an optical axis of the one of the two converged light beams.

6. An optical pickup device according to claim 1, further comprising:
   a collimating lens, disposed between the light source and the objective lens, for collimating the light beam; and a detecting element for detecting a servo error signal in accordance with the other one of the two light beams, wherein the objective lens converges the light beam from the collimating lens onto the recording medium and allows the converged light beam reflected from the recording medium to pass therethrough, wherein the beam splitter is disposed between the objective lens and the collimating lens, and wherein the optical element includes a toric lens disposed between the beam splitter and the optical waveguide element.

7. An optical device comprising:

a light source for generating a light beam;

an objective lens for converging the light beam onto a recording medium;

an optical waveguide element for detecting an information signal based on the converged light reflected from the recording medium, the optical waveguide element including a prism coupler, a waveguide layer and a photodetecting portion; and an optical element, disposed in an optical path on the light incident side of the optical waveguide element, for providing the converged light with astigmatism, wherein the optical waveguide element and the optical element are arranged to position a first focal line within a plane of the waveguide layer, to position a first focal point at an edge of the prism coupler and to position a second focal point on the photodetecting portion.

8. An optical waveguide element for detecting a signal in accordance with a converged light beam having astigmatism, comprising:

a photodetecting portion for detecting the signal;

a waveguide layer for propagating the converged light beam having astigmatism to the photodetecting portion; and a prism coupler, disposed on the waveguide layer, for coupling the converged light having astigmatism which is incident thereon to the waveguide layer, wherein the photodetecting portion and the prism coupler are arranged to locate a first focal line within a plane of the waveguide layer, to locate a first focal point at an edge of the prism coupler, and to locate a second focal point on the photodetecting portion.

9. An optical waveguide element according to claim 8, further comprising an optical element for providing a converged light beam having no astigmatism which is incident thereon with astigmatism, the optical element being disposed on a surface of the prism coupler.

* * * * *